United States Patent [19]

Morbioli et al.

[11] Patent Number: 4,640,768
[45] Date of Patent: Feb. 3, 1987

[54] ELUTRIATION APPARATUS FOR THE PURIFICATION AND SEPARATION OF POWDERS OF DIFFERENT DENSITIES

[75] Inventors: René J. Morbioli; Jean C. Ney, both of Corbeil, France

[73] Assignee: Societe Nationale d'Etude et de Construction de Moteurs d'Aviation - S.N.E.C.M.A., Paris, France

[21] Appl. No.: 620,957

[22] Filed: Jun. 15, 1984

[30] Foreign Application Priority Data

Jun. 29, 1983 [FR] France ................... 83 10717

[51] Int. Cl.$^4$ .......................................... B07B 9/02
[52] U.S. Cl. ................................. 209/37; 209/139.1
[58] Field of Search .................. 209/36, 37, 17, 138, 209/139 R, 158, 16, 210, 142, 143, 208

[56] References Cited

U.S. PATENT DOCUMENTS

| | | | |
|---|---|---|---|
| 555,920 | 3/1896 | Boericke | 209/17 |
| 603,319 | 5/1898 | Crowell et al. | 209/17 |
| 816,560 | 4/1906 | Cooley | 209/138 |
| 1,040,804 | 10/1912 | Stanley | 209/17 |
| 1,537,424 | 5/1925 | Elms | 209/210 |
| 2,641,335 | 6/1953 | Berg | 209/143 X |
| 2,714,453 | 8/1955 | Miller | 209/139.1 |
| 2,940,592 | 6/1960 | Cowden et al. | 209/139 R |
| 3,294,236 | 12/1966 | Lagarias | 209/139.1 |
| 3,457,336 | 7/1969 | Harris | 264/14 |
| 3,550,773 | 12/1970 | Villani et al. | 209/138 |
| 4,253,942 | 3/1981 | Gäumann | 209/17 |
| 4,321,134 | 3/1982 | Leschonski et al. | 209/133 |

FOREIGN PATENT DOCUMENTS

| | | | |
|---|---|---|---|
| 0003005 | 11/1979 | European Pat. Off. | |
| 138142 | 8/1880 | France | 209/158 |
| 425880 | 1/1911 | France | |
| 1514057 | 10/1961 | France | |
| 1359659 | 12/1962 | France | |
| 1025610 | 4/1966 | United Kingdom | |
| 421382 | 7/1972 | U.S.S.R. | 209/139.1 |

OTHER PUBLICATIONS

Patents Abstracts of Japan, vol. 6, No. 114 (Jun. 25, 1982), and JP 57 42 354 (Kawasaki Seitetsu K.K.) p. C-110-992, 3/9/1982.

Primary Examiner—Kenneth M. Schor
Attorney, Agent, or Firm—Oblon, Fisher, Spivak, McClelland & Maier

[57] ABSTRACT

An elutriation apparatus for the purification and separation of powders of different densities includes several separating columns each provided at the lower part with a collector for grains receiving the fraction of powder of coarse granulometry and a device for the removal of the grains, and at the higher part a mechanism for the introduction of the powder and of the carrier or transporting fluid and an outlet for the carrier fluid and lighter fractions of the powder. The mechanisms for the introduction of the powder and of the carrier fluid includes at least one distributor tube disposed on the vertical axis of the column and descending within the latter approximately down to the powder collector. The base of the distributor tube has at least one opening discharging towards a deflector. Each column includes of two zones of different sections and the ratio of the sections is constant from one column to the other.

2 Claims, 2 Drawing Figures

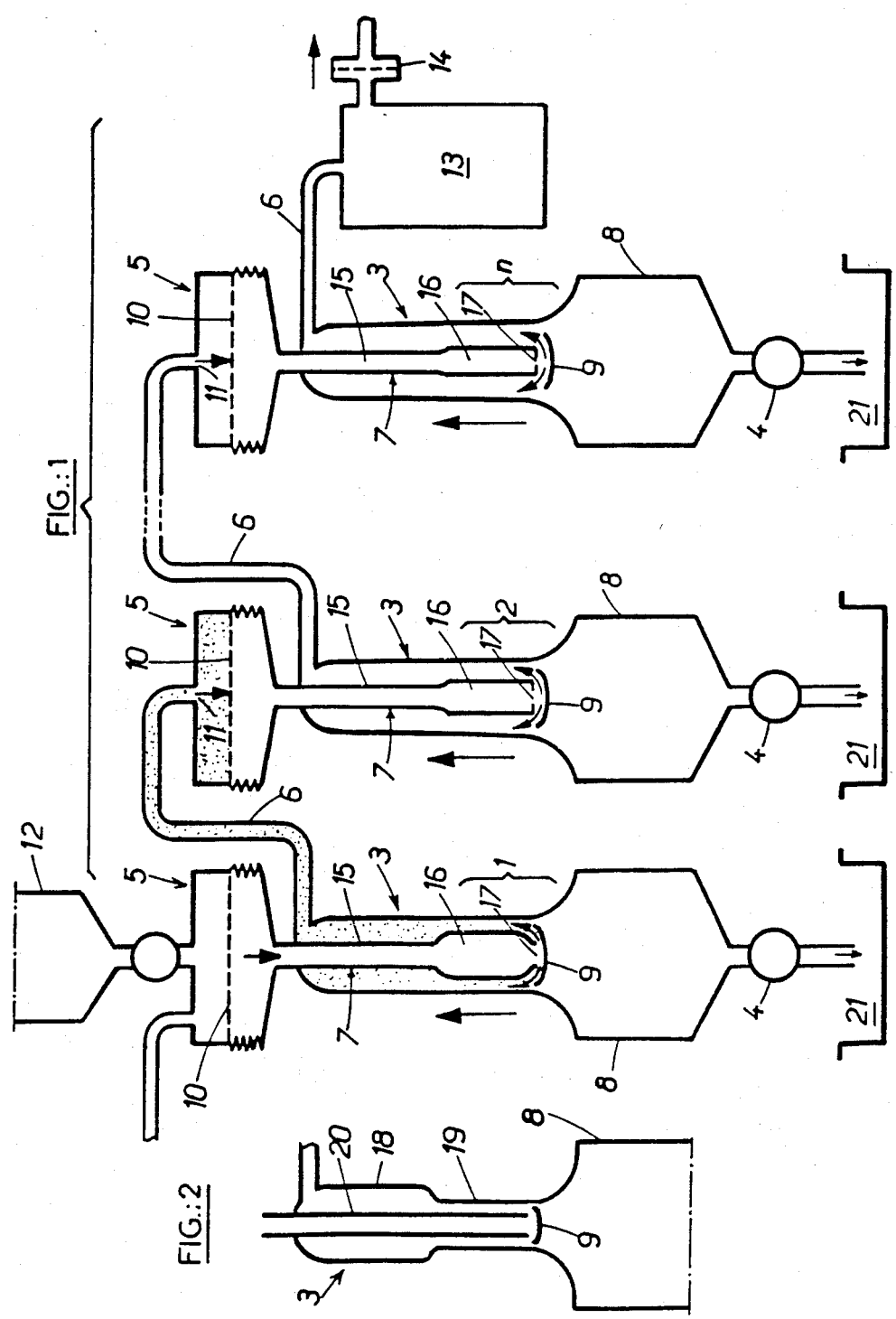

ELUTRIATION APPARATUS FOR THE PURIFICATION AND SEPARATION OF POWDERS OF DIFFERENT DENSITIES

BACKGROUND OF THE INVENTION

1. Field of the Invention

This invention relates to an elutriation apparatus for the purification and separation of powders of different densities, the apparatus comprising at least two classifying or separating columns having two zones of different section, an inlet for a carrier or transporting fluid, means for the introduction of powder to be classified, an outlet for carrier fluid at the upper part of the column and a recuperation filter through which the carrier fluid passes at the outlet of the column.

2. Discussion of the Background

The manufacture of parts in special alloys by sintering metallic powders has enabled improvement in the mechanical properties and reduction in the cost price of the parts. However, in order to reproduce in a consistent manner, high mechanical qualities from the manufacturing process it is necessary to utilise powders of high purity. The chemical purity and more particularly the absence of non-metallic impurities is of very high importance, particularly in respect of the fatigue strength at elevated temperatures. An important application is the manufacture of rotary parts, for turbines and compressors of jet engines, which are liable to high stresses. The demand for high purity powders, having an adequately defined granulometric spectrum, necessitates production means which are both complex and sensitive.

The article "Superclean Superalloy Powders" by Paul Loewenstein presented at the Powder Metallurgy Superalloy Conference Nov. 18–20, 1980, describes an apparatus enabling determination of the concentration of non-metallic inclusions in a metallurgical powder. The method, developed by Nuclear Metals Inc. (NMI), relies upon the principle of elutriation in water. A predetermined quantity of powder is placed in a glass column comprising at its lower part a screen capable of retaining the powder. Deionized and deaerated water is delivered to the base of the column so that the powder forms a fluidized bed mist of cloud. Water leaves the column at its upper part above the fluidized cloud, through an overflow tube and passes through a filter on which any non-metallic particles are retained. The number and the nature of the recovered particles is determined by a microscope.

This apparatus does not enable the production either continuously or semi-continuously of articles of high purity; and in fact the sole object is the control of the purity of the powder tested.

An elutriation method using air as the carrier or vehicle fluid is described in U.S. Pat. No. 3,457,336 and has as its object the formation of fat particles starting from molten droplets. The elutriation air is admitted at the lower part of the column. An inlet adjacent to the air inlet enables the supply of powder. The air and the powder carried thereby leave at the upper part of the column and pass through a filter. The powder retained is eventually recycled into the inlet. Droplets of molten product are introduced at the upper part of the column and fall into the powder cloud, within which they are cooled. They are evacuated at the lower part of the column in a continuous manner. The air current and the powder serve to cool the droplets and to avoid their aggregation. It is not sought to separate the granulometric mixture of powders, the quantity of droplets being substantial in relation to the amount of powder, but to separate the non-agglomerated powder from the droplets in order to produce at the outlet true granules.

Another apparatus is known from French Pat. No. 2318 681 enabling the separation of resins of different density. The column in which this separation is effected has two zones of different diameter: a lower zone of smaller diameter and an upper zone of larger diameter forming a torus around the upper end of the zone of smaller diameter. The mixture of resins is placed on a screen mounted adjacent to the bottom of the apparatus. The carrier water is delivered through the base and carries the resins which form a cloud of which the lighter grains occupy the higher part of the column. The water flows at a level above that of the upper limit of the cloud. The lighter fractions of the resins separate in the upper torus and the heavier fractions in the lower part of the column.

This apparatus does not permit separation, at least in a semi-continuous manner, the grains of a powder.

For various reasons referred to, these different processes do not enable powders to be separated in a simple manner, and in the case of a liquid, it is necessary, except in instances which relate to resins, to dry the separated powders, which increases the risk of pollution.

SUMMARY OF THE INVENTION

An object of the present invention is to provide elutriation apparatus for the separation of powders different densities capable of operating semi-continuously, the elutriation fluid being gaseous.

According to the present invention there is provided elutriation apparatus for the purification and separation of powders of different densities comprising a series of at least two separating columns each column incorporating means defining an upper zone, means defining a lower zone, the cross-sectional area of the lower zone being less than that of the upper zone, the ratio of the cross-sectional areas of the successive columns being substantially constant, and the cross-sectional area of the lower zone of column (n+1) of the series being such that the flow velocity therein is substantially equal to the flow velocity in the upper zone of the column n of the series which lies immediately upstream, means for the introduction of powder to be separated and for the introduction of a carrier fluid including a distributor tube arranged to discharge the fluid and powder carried thereby into the lower zone through an opening at the lower end of the tube, and a deflector plate disposed transversely of the opening at the lower end of the tube.

Preferably, at the carrier fluid outlet of each column a screen is so dimensioned that it retains the lighter particles of a minimum diameter substantially equal to the minimum diameter of the heavier particles in collecting means disposed at the bottom of the same column.

BRIEF DESCRIPTION OF THE DRAWINGS

A more complete appreciation of the invention and many of the attendant advantages thereof will be readily obtained as the same becomes better understood by reference to the following detailed descripton when considered in connection with the accompanying drawings, wherein:

FIG. 1 is a diagram of a treatment assembly incorporating an elutriation apparatus in accordance with the invention; and FIG. 2 is a diagram of a modification of a column used in the elutriation apparatus in accordance with the invention.

DESCRIPTION OF THE PREFERRED EMBODIMENT

FIG. 1 is a diagram of an assembly for treating powder by successive fractionation. This assembly is constituted by a number of apparatuses 1,2, ... n, corresponding to the number of fractions desired, disposed in series. Each apparatus of the assembly includes a separating column 3, provided at its lower part with a grain discharge device 4 and at its upper part an assembly for the introduction of powder and a carrier or transporting fluid indicated generally by reference 5. At the upper part of the column there is also provided an outlet 6 for carrier fluid loaded with the lightest fractions of the powder, that is to say grains of the same granulometry but of a lower density or of grains, with an equal density, of smaller granulometry than the grains retained in the upstream apparatus.

The assembly 5 comprises a distributor tube 7 mounted on the axis of the separating column 3 and descending within the latter to the lower part of the column forming a collector for grains 8 and receiving the grains of largest granulometry. A short distance from the at least partially open base of the distributor tube a deflector 9 is provided of which the shape is such as to direct the flow of carrier or transporting fluid to an ascending path within the column.

The upper end of the distributor tube 7 is connected to powder introduction means and more particularly to a lower chamber of a vibrating screen 10 of which the upper chamber receives the powder to be separated together with the carrier fluid. The fineness of the screen mesh is determined by its position in the treatment chain. The function of the screen, besides producing a homogeneous suspension of the powder in the fluid, is to arrest particles of large size, generally of non-metallic origin. The screen, other than the first of the chain, receives the carrier fluid loaded with powder through an inlet 11 provided in the upper part and generally on the axis of the upper chamber. The first screen of the chain, receives in accordance with the embodiment illustrated powder and the carrier fluid separately. The powder is contained in a reservoir 12 maintained in an inert gas atmosphere, preferably, the same as the carrier fluid, in order to avoid pollution.

In the embodiment diagrammatically illustrated, a powder made up of alloys of nickel in a flow of argon is separated.

The outlet for the carrier fluid and for the powder in suspension in the apparatus (n) of the chain connects with a recuperation chamber 13 having, leading from from its upper part, a filter 14 which retains dust and non-metallic particles, the fluid finally leaving the apparatus being substantially free of bodies in suspension so that it is possible to recycle the fluid within the installation.

In accordance with one construction of the separating columns 3, such have the appearance of a cylindrical enclosure of constant diameter on the axes of which are mounted respective distributor tubes 7. Each distributor tube 7 is constituted by two parts, a part 15 of a smaller diameter transversing approximately the upper half of the column, and a part 16 of a larger diameter occupying very approximately the lower half of the column. At least one outlet orifice 17 is provided in the bottom of the part 16. The deflector 9, mounted at the bottom of the part 16, has a concave shape, upwardly directed, and this deflector enables separation of the carrier fluid and the carried powder in a uniform manner in the annular space defined by the part 16 of the wall of the column. The distributor tube 7 thus forms within the interior of the column of constant diameter two annular zones of which the ratio of their sections can be selected and is determined by the diameters of the parts 15 and 16.

According to another embodiment of the separating column illustrated in FIG. 2, such is constituted by two parts 18 and 19 of different diameters, the upper part 18 having the larger diameter and the lower part 19 the smaller diameter. The distributor tube 20 has in this case a constant diameter from one end to the other. The bottom of the tube is open and has at least one opening for the passage of carrier fluid and the carried powder and supports at a short distance from its opening a deflector 9 having the concavity directed upwardly.

The velocity of carrier fluid in the separating columns is regulated for each of them by the ratio of the diameters of the column 3 and of the distributor 7 and is a function of the densities and of the diameters of the grains to be separated. It is to be noted that the minimum velocity of the fluid in the nth apparatus (upper part of the same column) is equal to the maximum velocity in the (n+1)th apparatus disposed upstream thereof (lowerpart of the (n+1)th column).

The screens are dimensioned so that the (n+1)th screen, that is to say that screen placed between the column respectively of n and (n+1), retain light particles of a minimum diameter substantially equal to the minimum diameter of the heavy particles retained in the collector 8 of the (n)th column.

The purification of the powders by elutriation is based on Stokes Law. Coarse powders, as manufactured, having been submitted to a coarser screening in order to eliminate the particles of larger diameter are constituted in the case of nickel alloys by grains of various diameters of a comparative density of 8.0 (corresponding to that of the metallic alloy) and a comparative density of less than 5.5 (corresponding to that of the non-metallic particles) as it relates to the density of water.

In accordance with Stokes Law such grains cannot be separated except under two conditions: the extreme diameters of the grains must be in a relationship $\leq 1.25$; the elutriation column or separating column must have two sections of which the ratio of the diameters is equal to 1:1.25, the sections and, as a consequence, the carrier velocities will be in the ratio $(1.25)^2$ and $1/(1.25)^2$. The manner of operation of the treatment chain according to the exemplary embodiment is described hereinafter.

The overall treatment is effected in a controlled atmosphere (argon) starting from powders handled under atmospheric conditions. The powders supplied from the common reservoir 12 are screened and separated semi-continuously in a current of argon. Periodically (every quarter of an hour for example) the supply of argon is interrupted and the dried powders descend into the receivers 21 each corresponding to a distinct granulometry, whilst the rejected particles remain on the screen 10 in dependance upon their respective granulometry.

The number of apparatus in series is a function of the initial granularometric spectrum. Thus, in the example described, the use of n apparatus enables the treatment of a powder of which the extreme diameters $\phi$ and $\theta$ of the particles are in the ratio $\phi/\theta = (1.25)^n$.

The separated powders can be then recombined in such a manner as to reform the initial granularometric spectrum (by providing a single receiver 21), or a different spectrum (by separating the granulometry and the percentage of each delivered from the receivers 21. In the case where for the use envisaged, i.e. there is a need for powders having a spectrum of very narrow granulometry, it is possible to follow with a fresh, finer, screening for powders previously made 'clean' in the sense of elimination of grains of different densities, according to the method hereinbefore described.

The velocity of the carrier fluid in the various separation columns is regulated for each one of them by ratio of the diameters of the column and of the distributor tube and is a function of the densities and of the diameters of the grains to be separated.

Obviously, numerous modifications and variations of the present invention are possible in light of the above teachings. It is therefore to be understood that within the scope of the appended claims, the invention may be practiced otherwise than as specifically described herein.

We claim:

1. An elutriation apparatus for purification and separation of powders comprising:
    at least first and second separating columns connected in series wherein each column further comprises an upper zone, a lower zone, a cross-sectional area of the lower zone being less than that of the upper zone in each of said columns, the ratio of cross-sectional areas in the respective upper and lower zones of the successive columns being substantially constant, and a cross-sectional area of the lower zone of column (n+1) of the series being such that the flow velocity therein is substantially equal to the flow velocity in the upper zone of the column n of the series which lies immediately upstream,
    means for the introduction of a powder containing at least two fractions of a first lower density and a second higher density to each of said first and second columns to be separated and for the introduction of a carrier fluid wherein said means for the introduction of powder further comprises a distributor tube arranged to discharge the carrier fluid and the powder carried thereby into the lower zone and through an opening formed at the lower end of the tube,
    a deflector plate disposed transversely of the opening at the lower end of the tube wherein the deflector plate deflects the carrier fluid and powder into said lower zone,
    means defining an outlet in the upper zone of said first column for the carrier fluid and powder
    means positioned at the lower end of the columns for collecting a fraction of powder of coarser granulometry of the second higher density powder fraction,
    means for removing the coarser grains from the means for collecting a fraction of the powder of coarser granulometry;
    means for interconnecting said means defining the outlet in the upper zone of the first column and the means for introduction of the powder and the carrier fluid to the lower zone of said second column; and
    a screen disposed between said columns and in said means for interconnecting the first and second columns, the mesh of said screen being such that said screen retains the first lower density fraction of particles of a minimum diameter substantially equal to the minimum diameter of the second higher density fraction of particles retained in the collecting means at the lower end of the immediately preceeding column wherein the first and second powder fractions are successively separated in the interconnected elutriating columns and screens such that the second high density fraction is deposited in successive sized fractions in each of the collecting means of said columns and the first low density fraction is retained on said screens located in the columns interconnecting means as successive sized fractions.

2. Apparatus according to claim 1, wherein each deflector plate further comprises a concave plate in an upward direction.

* * * * *